United States Patent
Paulsami et al.

(10) Patent No.: US 10,044,804 B2
(45) Date of Patent: Aug. 7, 2018

(54) ENABLING USERS TO SPECIFY AN ELECTRONIC RESOURCE FOR VIEWING BASED ON PRIOR ACCESSED ELECTRONIC RESOURCES

(71) Applicant: Oracle International Corporation, Redwood Shores, CA (US)

(72) Inventors: Prabakar Paulsami, Tirunelveli (IN); Bikram Singh Gill, Mohali (IN)

(73) Assignee: Oracle International Corporation, Redwood Shores, CA (US)

( * ) Notice: Subject to any disclaimer, the term of this patent is extended or adjusted under 35 U.S.C. 154(b) by 531 days.

(21) Appl. No.: 14/659,650

(22) Filed: Mar. 17, 2015

(65) Prior Publication Data

US 2016/0274742 A1    Sep. 22, 2016

(51) Int. Cl.
*G06F 3/00* (2006.01)
*H04L 29/08* (2006.01)
*G06F 17/30* (2006.01)

(52) U.S. Cl.
CPC .......... *H04L 67/1097* (2013.01); *G06F 17/30* (2013.01); *H04L 67/02* (2013.01); *H04L 67/22* (2013.01); *H04L 67/36* (2013.01); *G06F 17/30554* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 6,211,871 B1 | 4/2001 | Himmel et al. | |
| 6,314,423 B1 | 11/2001 | Himmel et al. | |
| 6,460,060 B1 | 10/2002 | Maddalozzo, Jr. et al. | |
| 6,622,917 B1 | 9/2003 | Knowles | |
| 8,510,282 B2 | 8/2013 | Murali | |
| 8,533,199 B2 | 9/2013 | Malla | |
| 2006/0155728 A1 | 7/2006 | Bosarge | |

(Continued)

FOREIGN PATENT DOCUMENTS

WO    1998040823 A1    9/1998

OTHER PUBLICATIONS

Dictionary.com ("Web Page—Web Site Definition").*

(Continued)

*Primary Examiner* — Tam T Tran
(74) *Attorney, Agent, or Firm* — IPHorizons PLLC; Narendra Reddy Thappeta (57) ABSTRACT

Aspects of the present disclosure provide a convenient user interface using which a user can identify and view electronic resources of interest. In an embodiment, the user enters a string for identifying a next resource to access. A first set of resource identifiers matching the string are determined, with each resource identifier being present in the content of a corresponding electronic resource previously accessed by said user. The identified first set of resources are listed on a display unit. Upon receiving a selection of one of the displayed electronic resources, the electronic resource is retrieved and the corresponding content is displayed on the display unit. In an embodiment, the user interface is provided as the user enters the search string in an address bar of a browser window. The resources previously accessed by the user using the browser application may also be displayed as a group.

19 Claims, 8 Drawing Sheets

(56) References Cited

U.S. PATENT DOCUMENTS

| | | | | |
|---|---|---|---|---|
| 2008/0215678 | A1* | 9/2008 | Coletrane | H04L 51/04 709/204 |
| 2010/0057739 | A1* | 3/2010 | Charka | G06F 17/30876 707/E17.001 |
| 2013/0019159 | A1* | 1/2013 | Civelli | G06F 17/30902 715/234 |
| 2013/0311869 | A1 | 11/2013 | Jang | |
| 2016/0162591 | A1* | 6/2016 | Dokania | G06F 3/0482 707/738 |

OTHER PUBLICATIONS

Ralf Krestel et al., Reranking web search results for diversity, Dec. 1, 2011, Springer Science & Business Media, Edition or vol. 15, pp. 458-477 (Year: 2011).*

Rahul Singh et al., Multiple perspective interactive search, Nov. 10, 2011, Springer Science & Business Media, Edition or vol. 62, pp. 507-543 (Year: 2011).*

URL Extractor 4, http://www.tensionsoftware.com/osx/urlextractor/, downloaded circa Oct. 27, 2014, pp. 1-3.

OverDrive Read, http://readinfo.overdrive.com/about/faq, downloaded circa Oct. 27, 2014, pp. 1-8.

Viewing the browsing history—Firefox, http://kb.mozillazine.org/Viewing_the_browsing_history_-_Firefox, downloaded circa Oct. 27, 2014, pp. 1-6.

BrowsingHistoryView v1.55—View browsing history of your Web browsers, http://www.nirsoft.net/utils/browsing_history_view.html, downloaded circa Oct. 27, 2014, pp. 1-7.

Navigation history in the BlackBerry Browser, http://docs.blackberry.com/en/developers/deliverables/11844/Feature_history_438488_11.jsp, downloaded circa Oct. 27, 2014, pp. 1-1.

Create Bookmarks, http://eguides.sprint.com/support/eguides/lgg2/index.html#lg_g2_ug/create_bookmarks.html, downloaded circa Oct. 27, 2014, pp. 1-1.

Keep Everything: Reading Later and Bookmarking Reinvented, http://techinch.com/blog/Keep-Everything, downloaded circa Oct. 27, 2014, pp. 1-6.

* cited by examiner

ENABLING USERS TO SPECIFY AN ELECTRONIC RESOURCE FOR VIEWING BASED ON PRIOR ACCESSED ELECTRONIC RESOURCES

BACKGROUND

Technical Field

The present disclosure relates to web browsers, and more specifically to enabling users to specify an electronic resource for viewing based on prior accessed electronic resources.

Related Art

Electronic resources are entities such as files, web page definitions, documents, images, records maintained by various applications, which have corresponding content represented digitally. Electronic resources are stored as files of a file system, rows of tables in a database, etc.

Users view electronic resources using applications and/or utilities suited for corresponding situations and resource types. For example, in case of a web page accessible via Internet, a user views the corresponding content using browser software. On the other hand, a software application such as Microsoft Word™ may be used for viewing the content of a word processing document.

A resource is said to be accessed when a user thus views the content ("read access"), or when the user causes formation (i.e., creation) or change of the content of such a resource ("write access"). In case of write accesses, the corresponding electronic resource may be stored in the form of a file or other suitable mechanism (e.g., database) that lends to storage and retrieval.

Among the plethora of electronic resources available for viewing, users generally provide a resource identifier to specify the specific electronic resource to be viewed next. In the case of web pages, the resource identifier is commonly referred to as a Uniform Resource Locator (URL). In case of files accessible locally, the resource identifier is in the form of file path and name combination.

It may thus be appreciated that there could be several prior accessed electronic resources when a user wishes to specify the next resource for viewing. Aspects of the present disclosure relate to enabling users to specify an electronic resource for viewing based on prior accessed electronic resources.

BRIEF DESCRIPTION OF THE DRAWINGS

Example embodiments of the present disclosure are described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

Aspects of the present disclosure provide a convenient user interface using which a user can identify and view electronic resources of interest. In an embodiment, the user enters a string for identifying a next resource to access. A first set of resource identifiers matching the string are determined, with each resource identifier being present in the content of a corresponding electronic resource previously accessed by the user. The identified first set of resources are listed on a display unit. Upon receiving a selection of one of the displayed electronic resources, the electronic resource is retrieved and the corresponding content is displayed on the display unit.

In an embodiment, the user interface is provided as the user enters the search string in an address bar of a browser window. The resources previously accessed by the user using the browser application may also be displayed as a group, in addition to the first set of resource identifiers noted above.

In an alternative embodiment, the user interface is provided in the context of a widget.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
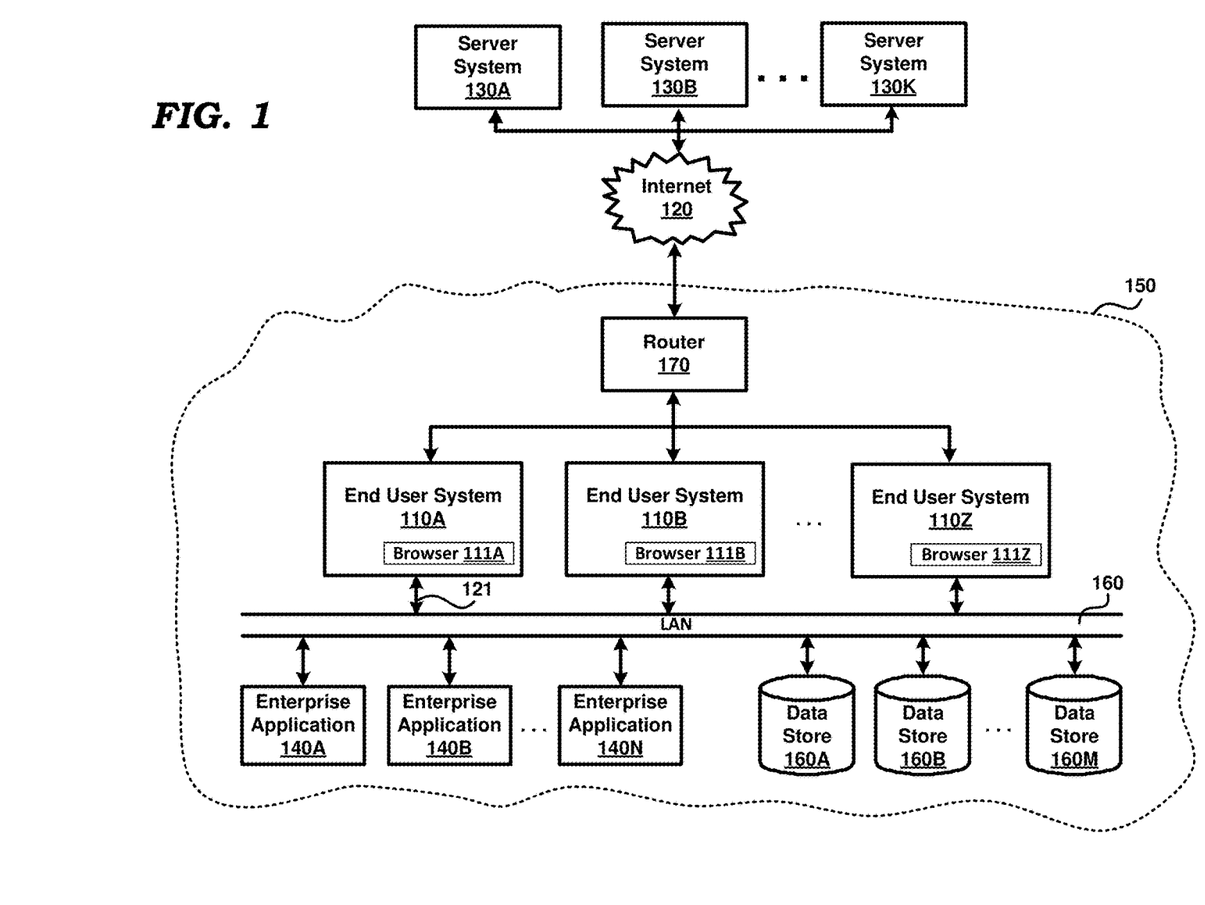
FIG. 1 is a block diagram illustrating an example environment in which several aspects of the present disclosure can be implemented.

FIG. 1 is a block diagram illustrating an example environment in which several aspects of the present disclosure can be implemented. The block diagram is shown containing server systems 130A-130K, Internet 120, and enterprise site 150. Enterprise site 150 is shown containing router 170, end user systems 110A-110Z, enterprise applications 140A-140N, and data stores 160A-160M, all shown connected by local area network (LAN) 160.

Merely for illustration, only representative number/types of systems are shown in the Figure. Many environments often contain many more systems, both in number and type, depending on the purpose for which the environment is designed. Each system/device of FIG. 1 is described below in further detail.

Each of server systems 130A-130K represents a server, such as a web server, capable of performing tasks requested by users using end user systems 110A-110Z. In a typical implementation, server systems 130A-130K host electronic resources such that upon request by users at end user systems 110A-110Z, the corresponding electronic resources are sent back as respective responses. The electronic resources may represent web pages such that the content of the web pages may be rendered at browsers-type software at the end user systems. Assuming the content is merely provided for viewing, the web pages are said to be accessed in read mode.

LAN 160 represents a corresponding network providing connectivity between end user systems 110A-110Z, enterprise applications 140A-140N and data stores 160A-160M all provided within the enterprise (i.e., enterprise site 150 shown with dotted boundaries). Internet 120 extends the connectivity of these (and other systems of the enterprise site 150) with external systems such as server systems 130A-130K. Each of LAN 160 and Internet 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

An IP packet is said to be directed to a destination system when the destination IP address of the packet is set to the IP address of the destination system, such that the packet is eventually delivered to the destination system by networks 120 and 160. When the packet contains content such as port numbers, which specifies the destination application, the packet may be said to be directed to such application as well. The destination system may be required to keep the corresponding port numbers available/open, and process the packets with the corresponding destination ports. Each of Internet 120 and LAN 160 may be implemented using any combination of wire-based or wireless mediums.

Router 170 receives and forwards packets, to provide connectivity between systems of enterprise site 150 and external systems such as server systems 130A-130K. For example, router 170 may receive a packet (originating) from end user system 110A, with the packet having a destination IP address of server system 130A, and forwards the packet to Internet 120 via path 121 for eventual delivery to server system 130A. Similarly, router 170 may receive packets from external systems (such as server system 130A) via Internet 120 for delivering the packet to an end user system (e.g., 110A), and accordingly such a packet is delivered to the end user system using LAN 160.

Each of data stores 160A-160M represents a non-volatile (persistent) storage facilitating storage and retrieval of a collection of data by applications executing in other systems of the enterprise site 150 such as end user systems 110A-110Z and enterprise applications 140A-140N. Some of the data stores 160A-160M may be implemented as a database server using relational database technologies and accordingly provide storage and retrieval of data using structured queries such as SQL (Structured Query Language). Some of the other data stores may be implemented as a file server providing storage and retrieval of data in the form of files organized as one or more directories, as is well known in the relevant arts. At least some of the data stored on each of the data stores 160A-160M may constitute electronic resources.

Each of enterprise applications 140A-140N (executing in corresponding servers) is capable of performing tasks requested by users using end user systems 110A-110Z. In response to receiving requests from end user systems, each enterprise application 140A-140N performs the tasks specified in the requests and sends the result of performance of the tasks to the requesting end user system. An enterprise application 140A-140N may use data stored internally (for example, in a non-volatile storage/hard disk), external data (e.g., maintained in data stores 160A-160M) and/or data received from external sources (e.g., from the user) in performing such tasks.

Examples of enterprise applications include chat application components of enterprise software applications such as help desk software, customer relationship management (CRM) software etc. In case of a chat application, chat transcripts are created when service agents participate in chat sessions with customers, and the transcripts constitute electronic resources. Since the content of the electronic resources (i.e., the text of the chat transcripts) is written by the service agents (as opposed to simply viewing it), the chat transcripts are said to be accessed in write mode.

Each of end user systems 110A-110Z represents a system such as a personal computer, workstation, mobile station, mobile phones, computing tablets, etc., used by users to generate and send user requests directed to local applications (e.g., desktop applications, mobile apps), external systems (such as server systems 130A-130K), or other systems/applications of the enterprise site 150 (such as enterprise applications 140A-140N). User requests may be generated using appropriate user interfaces. For example, user requests (specifically web page requests by specifying URLs) directed to server systems 130A-130K may be made using browsers 111A-111Z shown contained within each of the end user systems.

In the course of interacting with local or enterprise applications, users may cause the storage of URLs in corresponding electronic resources. In the example of the service agent participating in chat sessions with customers, URLs may be exchanged between the agent and the customer (e.g., to discuss some error on the page corresponding to the URL). The transcript of the chat (including the URLs referred to therein) would be stored in an electronic resource in a corresponding data store. However, if the URLs are merely exchanged, without the service agent visiting the web pages associated with the URLs, the web pages would not be saved in the end user system's browser history.

It may be desirable for the service agent to be able to identify such web pages (which are not saved in the browser's history) sometime in the future. Aspects of the present disclosure provide for viewing of such electronic resources, as described below with examples.

3. Flowchart

Figure 2:
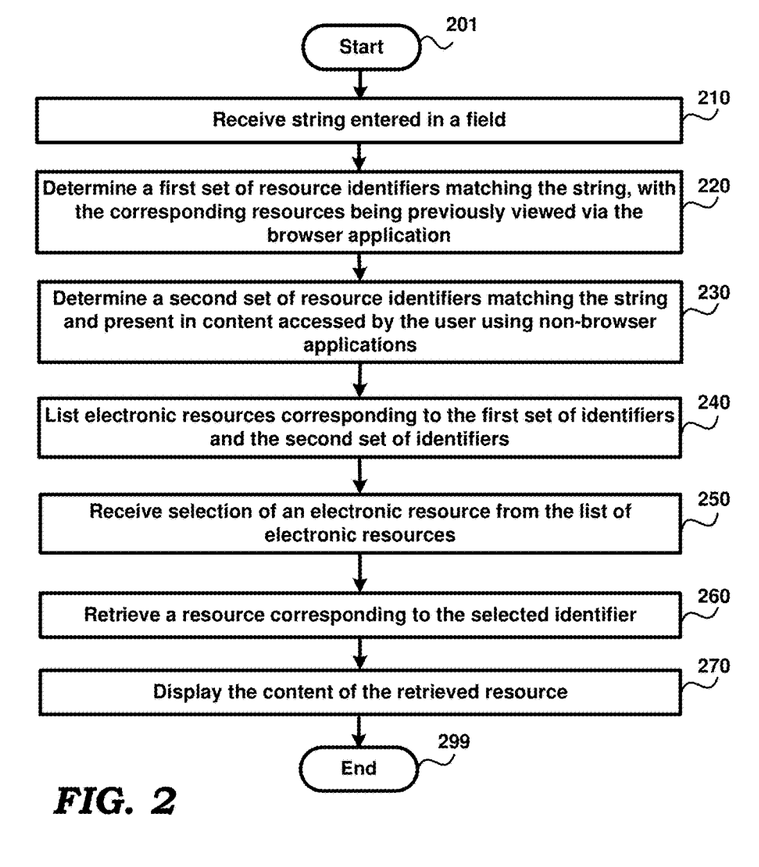
FIG. 2 is a flow chart illustrating the manner in which electronic resources are viewed according to an aspect of the present disclosure.

FIG. 2 is a flow chart illustrating the manner in which electronic resources are listed and retrieved, according to an aspect of the present disclosure. The flowchart is described with respect to browser 111A of FIG. 1 merely for illustration. However, many of the features can be implemented in other parts of end user systems and/or other environments (and using potentially other types of systems/servers) also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, browser 111A in end user system 110A receives a string entered by a user in a field, with the field being designed for a user to specify the next resource sought to be accessed. In case of browsers, the field may correspond to an address bar commonly provided by browser interfaces in which users can specify web pages (identified by corresponding resource identifiers), and also in which the resource identifiers of the presently displayed web page is also displayed.

In step 220, browser 111A determines a first set of resource identifiers that match the input string, where each of the resource identifiers have corresponding resources that have been previously viewed via browser 111A. Matching implies that the sequence of characters forming the string is present in any portion of the resource identifier in the same order. In an embodiment, the first set of resource identifiers are URLs of web pages (i.e., resources), which have been previously accessed via browser 111A (e.g., present in browser history).

In the example above, matching of the input string with the first set of resource identifiers may be performed in any known way. As may be readily appreciated, the string in many instances forms only a part of the resource identifier, and thus a match is deemed to have been found upon the occurrence of a text match of the string with the resource identifier. In such a case, the determination of the first set of identifiers implies that the each of the first set of identifiers contains the input string as part of the URL.

In step 230, browser 111A determines a second set of resource identifiers that match the input string, where each of the second set of resource identifiers are present in content previously accessed by the user using non-browser applications. In an embodiment, non-browser applications include agent-interface portion of enterprise applications 140A-140N (e.g., chat software provided as a part of CRM applications), email client, word processing software etc., which are used at end user system 110A. Some of these non-browser applications generate respective content which is stored as a corresponding electronic resource (e.g., file). Some other non-browser applications may be used to merely view content of the corresponding electronic resources.

For example, if the non-browser application is chat application, the electronic resources are chat transcripts that are created when users participate in a chat session, the content is the text representing the chat communication between parties (agent and customer), and the second set of resource identifiers are URLs that the parties may have exchanged during the course of the chat session. The generated transcripts are stored as respective files by the chat software in a corresponding data store, e.g., data stores 160A-160M.

In the example of a chat session, matching of the input string may be performed by first searching the corresponding content of the chat transcripts, and thereafter comparing the input string to resource identifiers (file names, URLs, etc.) in the content using any known methods such as a text match as described above with reference to step 220.

In step 240, browser 111A lists (on a display unit) electronic resources corresponding to the first set of identifiers and the second set of identifiers. The listing can be provided in any order (e.g., horizontal, vertical) and/or grouped in any convenient matter, as suitable in the corresponding environment. In an embodiment, the listing of electronic resources is accomplished by displaying resource identifiers that correspond to the electronic resources.

In step 250, browser 111A receives selection of an electronic resource from the list of electronic resources listed on the display. In the example of the electronic resources being listed by corresponding resource identifiers, the selection of an electronic resource means the selection of a resource identifier from the list. The selection may be received in a known way.

In step 260, browser 111A retrieves an electronic resource corresponding to the selected resource identifier. Assuming that the electronic resource corresponds to a web page accessible via Internet 120, the corresponding resource is hosted on server systems 130A-130K such that when the user selects the resource identifier in step 250, the resource identifier is sent to corresponding server system, causing the server system to send the requested electronic resource to browser 111A on end user system 110A.

In step 270, browser 111A displays the content of the retrieved resource. In the example of the resource being a web page, the display of the content is therefore the display of the web page on a display unit associated with the end user system 110A. On the other hand, if the resource corresponds to a file accessible by applications such as word processors, the corresponding word processing application may be invoked to provide a view of the content. The flowchart ends in step 299.

Thus, in accordance with FIG. 2, a user may easily access electronic resources that s/he may have been exposed to in prior viewed content. These electronic resources are disclosed above to be accessible in combination with electronic resources previously viewed using the browser (when using the browser). In the example case of an agent having used chat sessions, the URLs (or corresponding resources) referred to in the chat sessions are made accessible via the browser.

The description is continued with respect to the details of end user system 110A in an embodiment.

4. End User System

Figure 3:
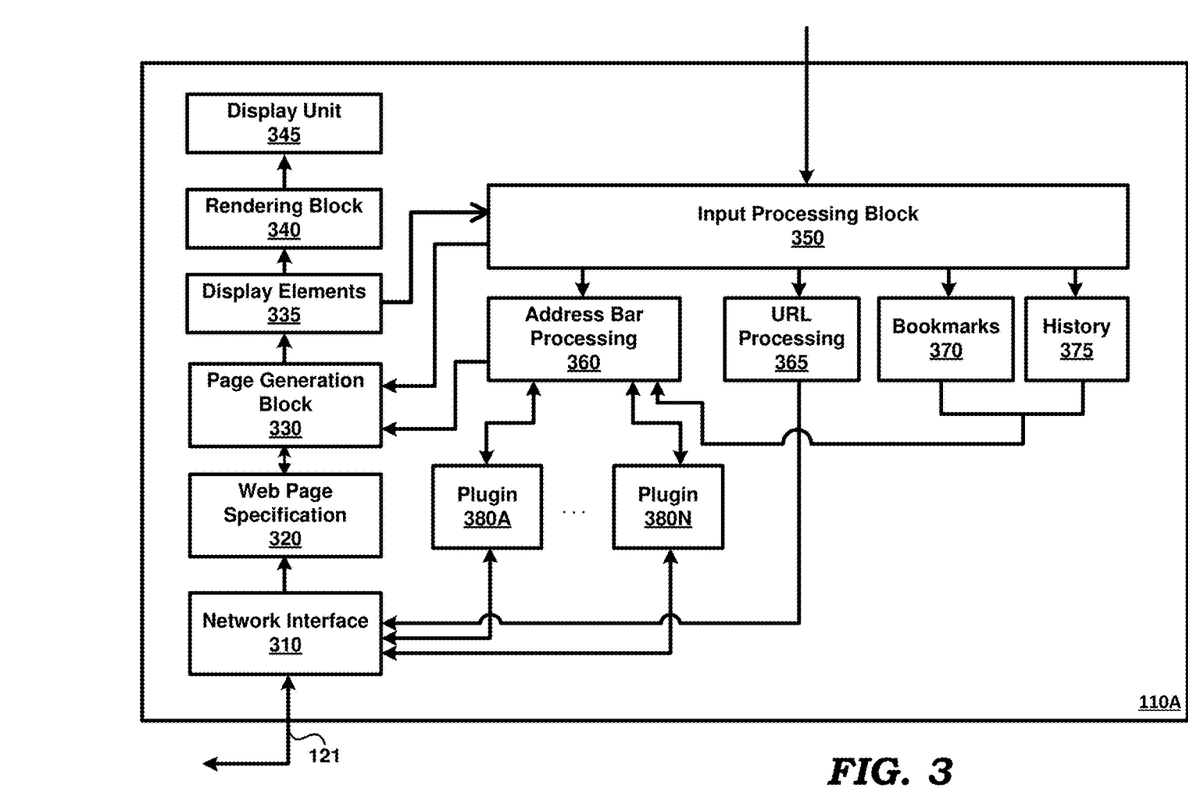
FIG. 3 is a block diagram illustrating the detailed architecture of an end user system, in an embodiment.

FIG. 3 is a block diagram illustrating the detailed architecture of end user system 110A in an embodiment. The block diagram is shown containing network interface 310, web page specification 320, page generation block 330, display elements 335, rendering block 340, display unit 345, input processing block 350, address bar processing 360, URL processing 365, bookmarks 370, history 375, and plugins 380A-380N. Each of the blocks is described in detail below.

Network interface 310 represents a communication interface (e.g., an Ethernet card) to enable various blocks of end user system 110A to communicate via network path 121. In general, packets directed to end user system 110A are examined for forwarding to appropriate internal block (320, 380A-N), typically based on the TCP/UDP port number. Similarly, network interface 310 sends packets directed to other external systems shown in FIG. 1 upon receipt of the corresponding packets, with identity of the target system, from the respective block. In the context of a user requesting an electronic resource that is a web page, from server systems 130A-130K, network interface 310 receives the packets corresponding to the web page and stores the payload in the packets as web page specification 320.

Web page specification 320 represents the source code (e.g., HTML) of the web page(s) presently being rendered. Source code defines various elements and associated characteristics. The characteristics may specify the interactive features, display attributes, content, shape, size, location, color, background, etc., as suited for the corresponding elements. The content of the corresponding web page may thus be viewed as including the various elements and the characteristics of the elements.

Display elements 335 contain the elements that define a web page's current view as rendered on display unit 345. For each such web page, display elements 335 contain a corresponding display map, indicating (a) what element(s) of the source code map to (or are displayed on) which area on the rendered web page, and (b) the action/behavior of the displayed elements (e.g., upon user selection of the element, the corresponding action required).

Page generation block 330 forms display elements 335 of a web page for each applicable duration, based on web page specification 320 and other inputs to the block shown in the Figure. In general the source code may contain definitions of elements that are not displayed in a given duration, and some of the elements may be displayed only partially due to display screen size and/or properties of other elements. Page generation block 330 determines the web page layout for each duration by selecting appropriate elements and specifying the display area to be occupied by each selected element (for that duration). The corresponding output is stored as display elements 335.

In operation, when generating the display corresponding to a web page for a first time, display elements 335 may be formed based on processing of the elements in web page specification 320 alone. Thereafter, page generation block 330 accepts user inputs (as corresponding events) from input processing block 350 and address bar processing 360, and updates display elements 335 as response to corresponding user inputs.

In response to receiving an event representing a user input from input processing block 350, page generation block 330 updates display elements 335 as appropriate for the user input. The change may entail incorporation of a single character if the user input represents insertion of a character in an appropriate field, or can entail removal and addition of elements in case of scroll type of operations. On the other hand, processing of inputs from address bar processing 360 may require different types of processing depending on the type of inputs received, as described below.

Rendering block 340 processes the display characteristics of display elements 335 and renders the web page on a display unit 345. Such rendering may entail generating a bit map with appropriate color values for each bit/pixel position, and generating display signals (e.g., in RGB format) representing the bit map to display unit 345. Display unit 345 displays the web page rendered by the rendering block 340. Display unit 345 may be any display device connected to the end user system 110A through wired or wireless medium.

History 375 indicates the web pages previously accessed using browser software. History 375 may include simply the corresponding URLs, or also the web page content (in which case history 375 may be termed as cache). History 375 may be implemented as a text file providing storage and retrieval of web page data, as is well known in the relevant arts. History 375 is updated as the user browses and accesses web pages using browser 111A. History 375 also provides address bar processing 360 with URLs that match the string being processed by address bar processing 360.

Bookmarks 370 store URLs that have been saved by the user. As may be appreciated, users often store URLs in order to visit the corresponding web pages at a later time. Bookmarks 370 may be implemented as a text file providing storage and retrieval of URL data, as is well known in the relevant arts. Bookmarks 370 also provide address bar processing 360 with the URLs that match the string being processed by address bar processing 360.

URL processing 365 processes the requests for web pages received in the form of corresponding URLs. As may be readily appreciated, such requests are received upon a user clicking on a hyperlink, when submitting a URL entered on address bar, or performing a submit action on appropriate field of a rendered web page. URL processing 365 sends the request for the web page to network interface 310. After network interface 310 receives data packets corresponding to the webpage, the web page is displayed on display unit 345 after processing through blocks 320-345, as described earlier.

Input processing block 350 processes user inputs as the user interacts with various elements on a displayed web page. Typically, each user input is received by input processing block 350 as a corresponding event, indicating the input type (key strokes, click, drag, etc.) along with relevant parameters (character pressed in case of key-stroke, coordinates defining the mouse operations), etc. The event is translated to the user input by examining display elements.

For each user input corresponding to a character (prior to submit action) on the address bar of a rendered, the character information is passed to page generation block 330 for updating the address bar to reflect the entered character. The character is also passed to address bar processing 360.

In general, if the user input is designed to cause changes to a web page currently being displayed on browser 111A, such changes are communicated to page generation block 330 so that the any changes to the corresponding display map (in display elements 335) are made in order to render the updated page to the user. For example, if input processing block 350 receives an on-click event corresponding to an image displayed of the display screen, processing is passed on to page generation block 330, which performs any actions associated with the on-click event by examining the display element associated with the image coordinates.

On the other hand, if the user input represents a click on a hyperlink, the corresponding URL is determined by examining display elements 335, and passing the URL to URL processing 365.

Input processing block 350 may contain an internal buffer to store any state information (e.g., sequence of characters previously entered, without submit action on address bar), and may examine such state information also to determine the user input type.

If the user inputs a URL to be stored as an individual bookmark, in order to access the electronic resource corresponding to the URL at a later time, such inputs are passed on to bookmarks 370. If the user submits a URL for viewing the next electronic resource (i.e., the web page corresponding to the input URL) on the address bar, such user input/submission is passed on to URL processing 365 for further processing. In such a case, the submitted URL is also sent to history 375 for storage.

Address bar processing 360 constructs a partial string being entered by a user, based on individual characters received from input processing block 350. Address bar processing 360 is also in communication with history 375, bookmarks 370, and plugins 380A-380N so that when the user enters the (partial) string in the address bar, history 375, bookmarks 370, and plugins 380A-380N provide address bar processing 360 with resource identifiers that match the entered string. Address bar processing 360 sends the matched resource identifiers to page processing block 330, which are then displayed to the user on browser 111A via display unit 345 based on modifying the corresponding display map of the web page in display elements 335. The updated display of the web page would show the input string as well as any matching URLs retrieved from bookmarks 370, history 375, and plugins 380A-380N.

Plugins 380A-380N are browser extensions built into browser 111A that extend the functionality of browser 111A to retrieve URLs matching the string entered by the user in the browser's address bar. A browser extension represents software code that is added to a browser to enhance the functionality of the browser, with the enhanced functionality specified in the software code of the extension. Plugins may be created for local applications on end user systems 110A-110Z, or enterprise applications 140A-140N, such that for each local/enterprise application for which there is a plugin, the plugin is programmed to interface with network interface 310 to read the content of electronic resources accessed by that application, (stored in corresponding data stores) and retrieve URLs that match the string entered by the user.

For example, plugin 380A may be provided in the context of URLs accessed by enterprise application 140A from electronic resources stored in data store 160A. Plugin 380A may be provided such that when the user enters the string in the browser's address bar, plugin 380A communicates with network interface 310 to search the content of electronic resources stored in data store 160A (and previously accessed by the user) to find a match of URLs. In addition, tags associated with any of such URLs may also be searched for a match (i.e., the tag associated with the embedded URL contains the string entered so far by the user).

Upon finding one or more URLs (in the content) that are determined to match accordingly, plugin 380A retrieves the URLs from the electronic resources and presents the URLs to address bar 360 for further processing. Assuming plugin 380A corresponds to a chat application, the URLs referred to in chat sessions may be provided to address bar processing 360.

In an embodiment, the plugin limits the search to chat sessions created by the user. Such an objective may be achieved, for example, by having a user identity in relation to the files (as creator) representing the chat sessions, and therefore plugin 380 may cause only such files (but not created by other users) created by the same agent/user (using the browser) to be searched. In an alternative embodiment, end user system 110A maintains locally the chat sessions of the corresponding user using that system. Thus, assuming only the same agent uses end user system 110A, the chat sessions managed locally represent the chat sessions of that agent alone, and only the content corresponding to the agent may be searched.

The manner in which end user system 110A may facilitate the retrieval and display of a resource according to FIG. 2 is illustrated below with examples.

5. User Interfaces

FIGS. 4A-4D depicts various user interfaces that may be provided for listing and retrieving electronic resources in one embodiment. Each Figure depicts a portion of a user interface (display area 400) provided on display unit 345 associated with client system 110A.

In one embodiment, display area 400 corresponds to a web page rendered by browser 111A executing on client system 110A, and display area 405 corresponds to an address bar on the web page. Web pages are provided in response to a user sending appropriate requests (for example, by specifying corresponding URLs in the address bar) using browser 111A.

Figure 4A:
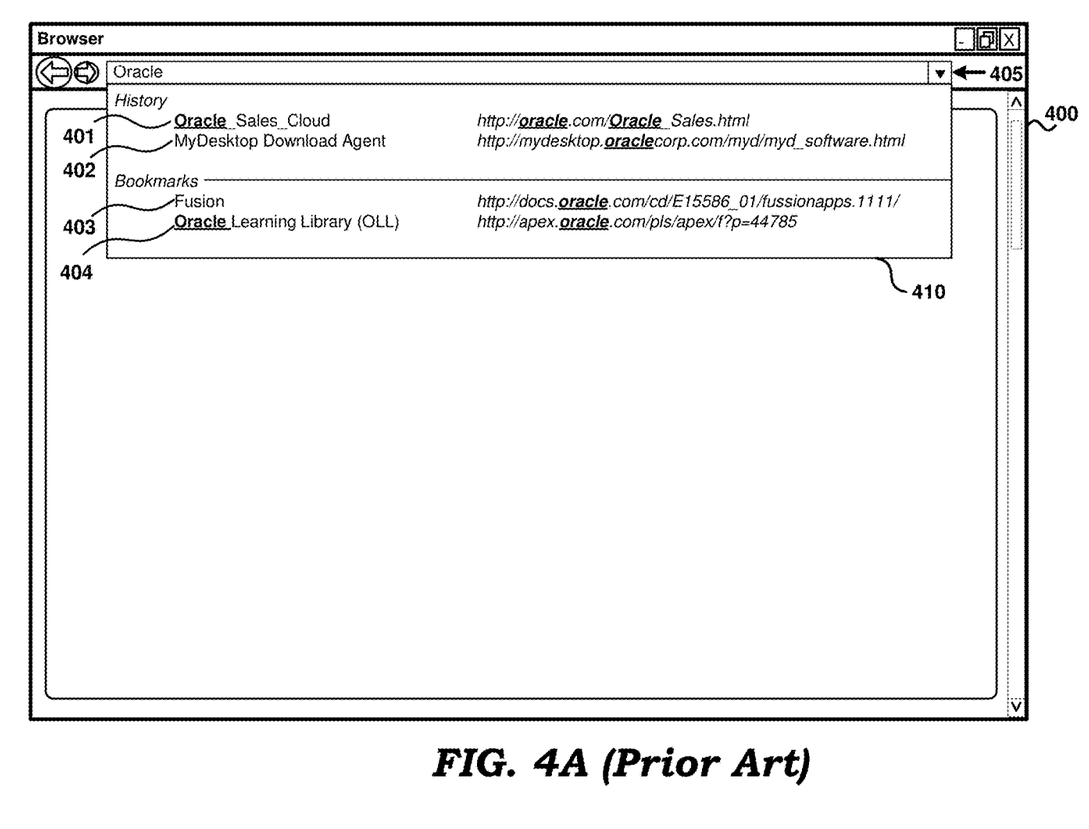
FIGS. 4A-4D depicts various user interfaces that may be provided for listing and retrieving electronic resources in one embodiment.

FIG. 4A depicts the user interface provided by a typical web browser. Display area 405 indicates that the user has entered a string "Oracle" in the browser's address bar. In response to the user entering the string, a drop-down list containing web pages (identified by corresponding URLs) is presented as display area 410. The drop down list is shown associated with the address bar in that clicking on down-arrow in the address bar 405, there causes display 410 to be toggled. However, display area 410 may be associated with the interactions of address bar 405 in other ways as well.

Specifically, display area 410 indicates that web pages (resources) 401-404 have matched the string "Oracle" that was entered by the user. Web pages 401 and 402 represent web pages that have previously been accessed by the user, by way of visiting the web pages using browser 111A. Accordingly, web pages 401 and 402 are grouped under a group title "History" in display area 410, as is well known in the relevant arts. Web pages 403 and 404 represent web pages that have previously been accessed by the user, by way of bookmarking the web pages using browser 111A. Accordingly, web pages 403 and 404 are grouped under a group title "Bookmarks", as is well known in the relevant arts.

Figure 4B:
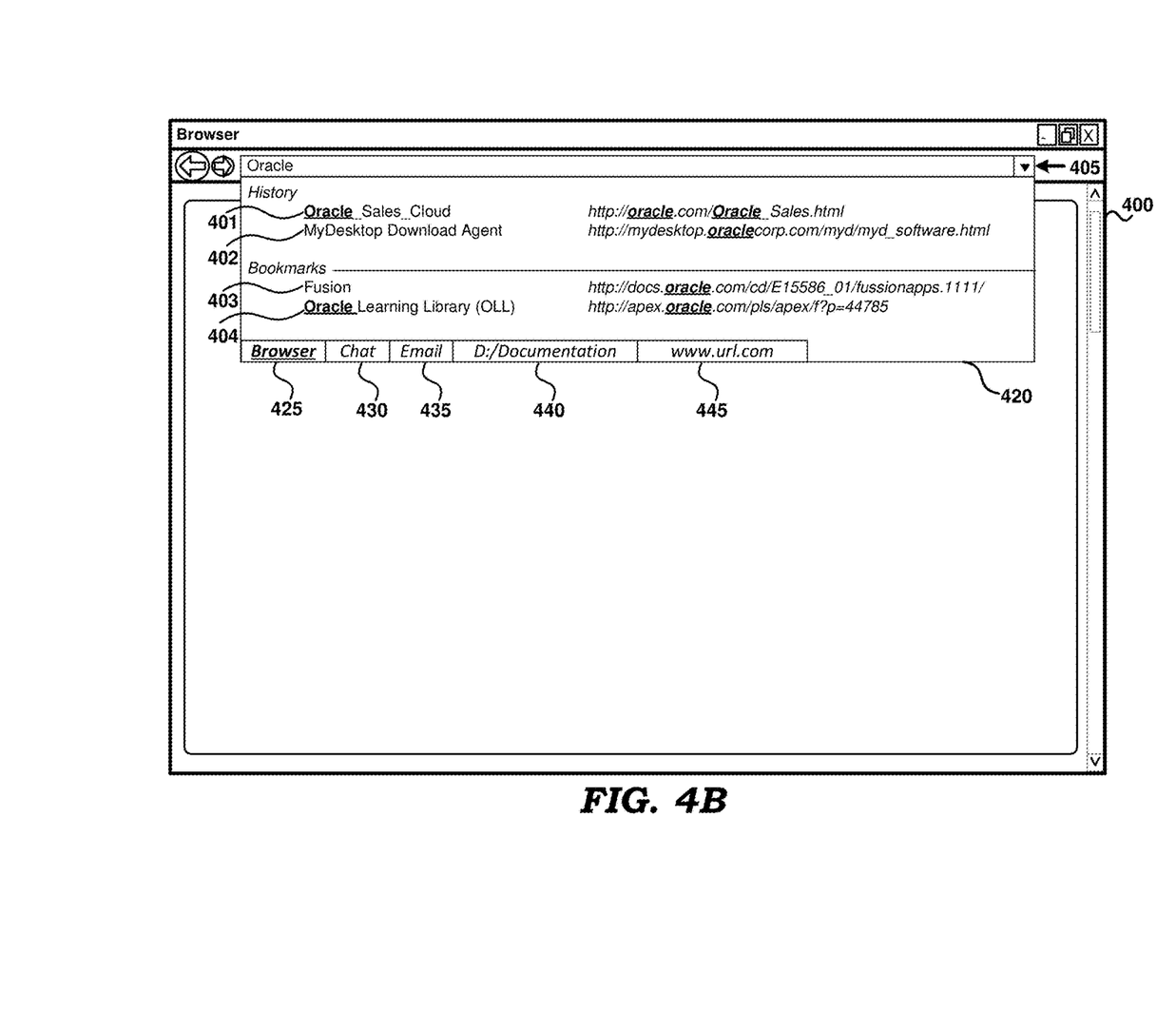
Figure 4C:
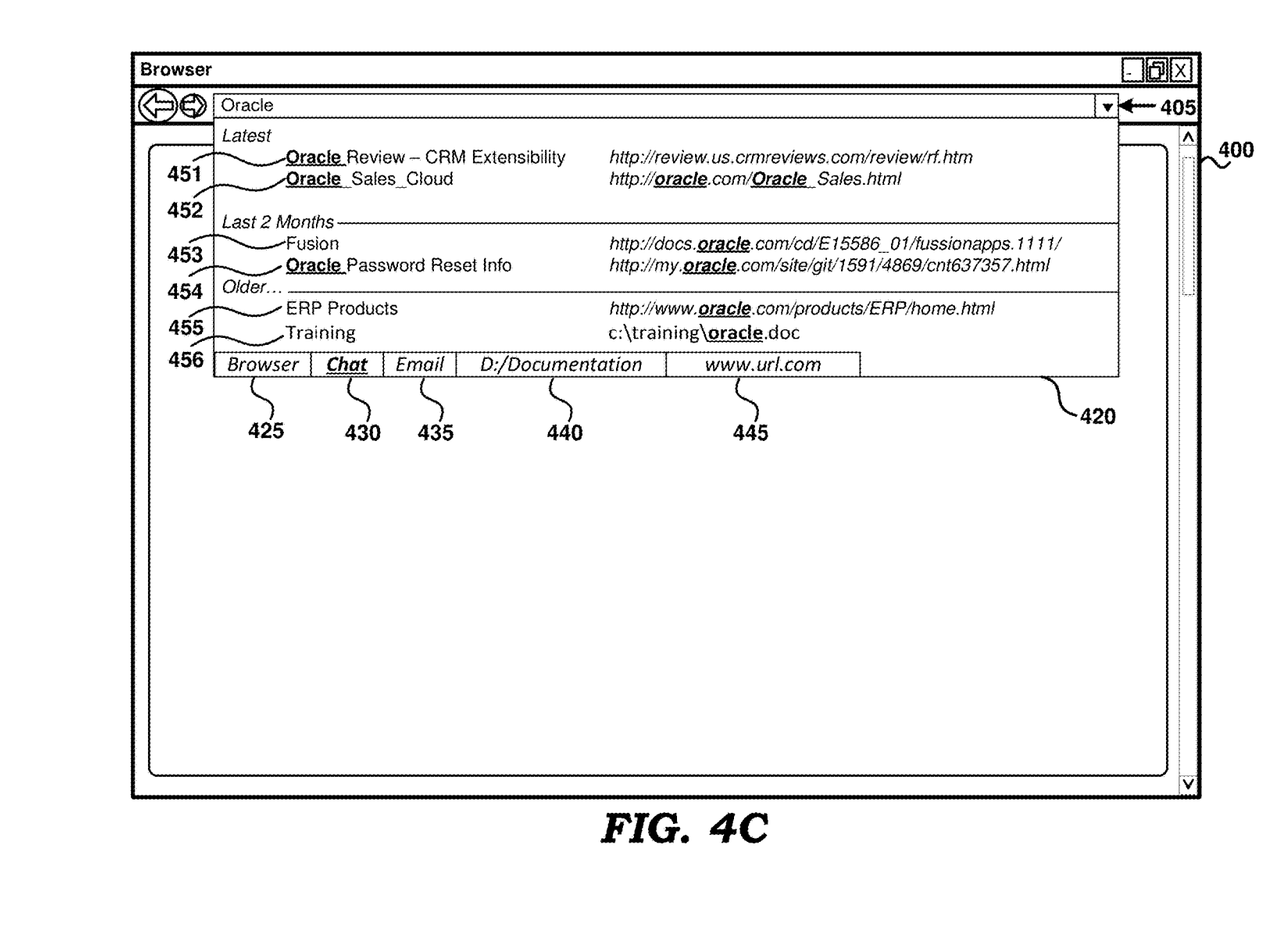

FIGS. 4B and 4C depict the manner in which a web browser implementing several features of the present disclosure lists web pages matching the string entered by the user. Specifically, FIGS. 4B and 4C show five tabs named Browser 425, Chat 430, Email 435, D:/Documentation 440, and www.url.com 445, indicating the various sections in which the web pages matching the entered string may be arranged into.

It should be noted that for convenience of illustration, only five representative sections have been shown in the drop-down list associated with display area 420, whereas any number of sections may be included in browser 110A, as suited to the specific environment, as will be apparent to one skilled in the relevant arts.

Each of the sections 425-445 represents a source of electronic resources accessed by a corresponding plugin (as shown in FIG. 3). Specifically, each section represents a non-browser application (enterprise or local) or a component of a non-browser application (e.g., chat) that was previously used by the user to access electronic resources stored by the corresponding application in a respective data store.

FIG. 4B shows that browser 425 has been selected in the drop-down list of display area 420. The selection of browser 425 may be accomplished via user action (e.g., the user specifically selecting the label "Browser" associated with section 425. Alternately, one of the sections 425-445 may be configured to be displayed as a default section upon rendering of display area 420.

It may be noted that the web pages listed upon selection of browser 425 are the same web pages that were displayed by the typical browser shown in FIG. 4A (see display area 410). This is to illustrate that browser 110A retains its typical browser functionality, in addition to the new functionality made available by the browser implementing several features of the present disclosure. As shown, in response to the user selecting browser 425, the same set of web pages previously shown (401-404) in FIG. 4A are also shown in FIG. 4B representing the set of web pages that match the string entered by the user.

FIG. 4C shows that chat 430 has been selected in the drop-down list of display area 420. Chat represents a component of a non-browser application (e.g., a CRM). Chat sessions are stored as corresponding files in a corresponding data store accessible by the chat application. In response to the user selecting chat 430, web pages 451-455 are shown displayed in display area 420, representing the set of resources (including web pages and local files as well) identified by resource identifiers that match the string entered by the user. It may be noted that for 451 the match is found based on the resource identifier tag, and not the actual resource identifier URL.

In an exemplary scenario, the user is a service agent who previously participated in chat sessions with customers, and in the course of such participation, accessed web pages (identified by URLs). In such context, the transcripts of such chat sessions would contain the accessed URLs and file identifiers. When the user enters the string "Oracle", the plugin (e.g., plugin 380A of FIG. 3) corresponding to the chat application may connect to the data store (e.g., data store 160A) associated with the chat application and search the content of the electronic resources (i.e., the text of the chat transcripts) to find a match with the entered string. If a match is found, such web page (and the identifying URL) will be sent to display area 420 for listing in the drop-down list. Accordingly, web pages 451-456 represent the set of web pages stored in the content of the data store associated with the chat application that match the string entered by the user.

For convenience of illustration, the listing of the web pages has been shown in the form of a drop-down list. However, the listing can be accomplished in any number of ways, as suited in the corresponding environments. For example, the sections of web pages may be arranged as a continuous list in the drop-down list. In another example, when there is only one URL to be listed, the list may be in the form of an "auto-fill" feature, where the web page (identified by the corresponding URL) is auto-filled in the address bar. Here, the selection of a web page means accepting the auto-fill suggestion, e.g., by selecting the return key on a keyboard that is in communication with the browser 111A while the auto-filled suggestion is being displayed.

Figure 4D:
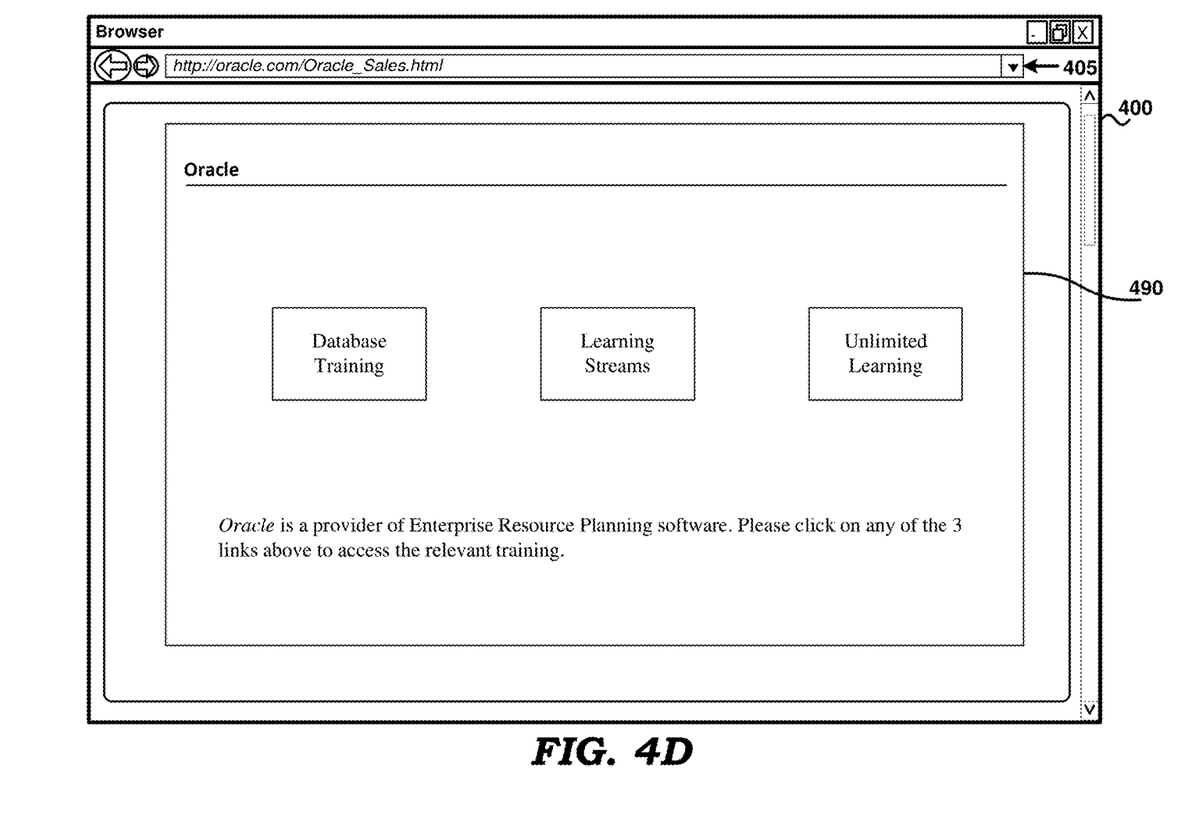

Assuming the user has selected web page 452 from FIG. 4C, FIG. 4D shows an exemplary web page that is rendered as a result of such selection. FIG. 4D also shows that the address bar in display area 405 shows the URL of the currently displayed web page 452.

While the above example depicts a web page being accessed, alternatively the Training file shown there can also be selected by a user. In such a case, a suitable plug-in (not shown) can be employed or the corresponding application (here, MS-word word processing application) launched to display the content.

It may thus be appreciated that a user at browser applications may conveniently access electronic resources referred to in the content of electronic resources previously accessed by the user. In addition, while the access is described to be from within a browser, it should be appreciated that alternative embodiments can be setup to provide some of the features from widgets type of applications, as described below in further detail.

6. Implementation Using Widgets

Widgets are self-contained tools that are typically provided as add-on software for use within another environment/application. Examples of widgets include, search bars implemented on desktop/web environments such as Google Quick Search Box (™), Google Custom Search Engine (™), Bing Desktop (™), Yahoo BOSS Search Box (™) etc., and toolbars implemented on browsers such as Google Toolbar (™), The Amazon Toolbar (™) etc.

In the context of a widget, a user may select an electronic resource on an interface that provides a similar interface to an address bar of the browser, as described above. However, once the resource of interest is selected as explained with respect to FIG. 4C, the widget launches the corresponding application (including browser in case the selected resource identifier corresponds to a URL).

It should be further appreciated that the features described above can be implemented in various embodiments as a desired combination of one or more of hardware, executable modules, and firmware. The description is continued with respect to an embodiment in which various features are operative when the instructions in the executable modules are executed.

7. Digital Processing System

Figure 5:
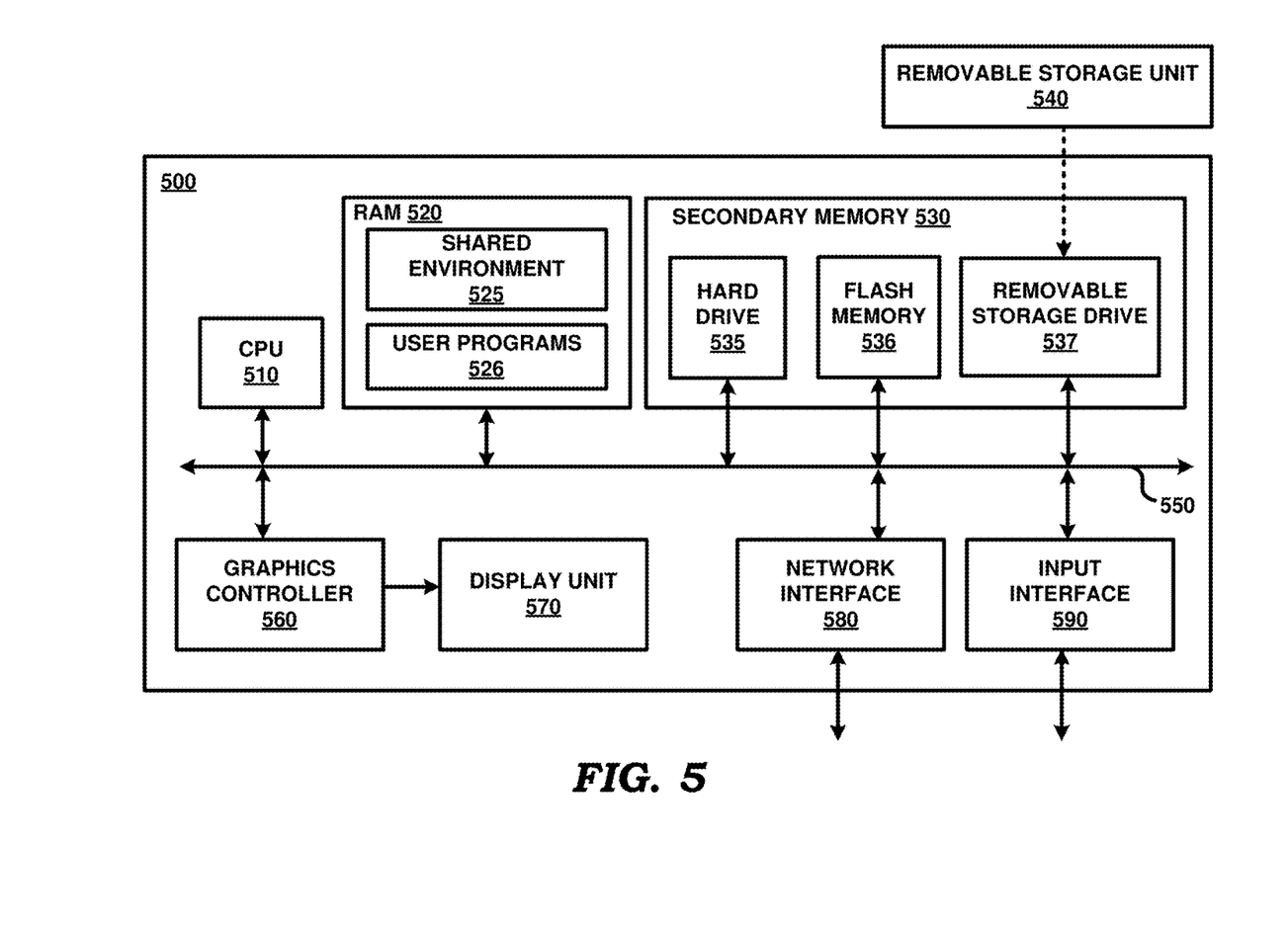
FIG. 5 is a block diagram illustrating the details of a digital processing system in which several aspects of the present disclosure are operative by execution of appropriate software instructions.

FIG. 5 is a block diagram illustrating the details of digital processing system 500 in which several aspects of the present disclosure are operative by execution of appropriate software instructions. Digital processing system 500 corresponds to end user systems 110A-110Z from which various features described above can be provided.

Digital processing system 500 may contain one or more processors (such as a central processing unit (CPU) 510), random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present disclosure. CPU 510 may contain multiple processing units, with each processing unit potentially being designed for a specific task. Alternatively, CPU 510 may contain only a single general-purpose processing unit. RAM 520 may receive instructions from secondary memory 530 using communication path 550.

RAM 520 is shown currently containing software instructions constituting shared environment 525 and/or user programs 526 (such as desktop applications, browsers, widgets, etc.). Shared environment 525 contains utilities shared by user programs, and such shared utilities include application servers, operating system, device drivers, virtual machines, flow engines, etc., which provide a (common) run time environment for execution of user programs 526.

Graphics controller 560 generates display signals (e.g., in RGB format) to display unit 570 based on data/instructions received from CPU 510. Display unit 570 contains a display screen to display the images defined by the display signals (such as the portions of the user interfaces of FIGS. 4A-4C). Input interface 590 may correspond to a keyboard and a pointing device (e.g., touch-pad, mouse) that may be used to provide various inputs (such as to specify the desired inputs, etc. in the user interfaces of FIGS. 4A-4C). Network interface 580 provides connectivity to a network (e.g., using Internet Protocol), and may be used to communicate with other connected systems (such as server systems 130A-130K, data stores 160A-160M).

Secondary memory 530 may contain hard drive 535, flash memory 536, and removable storage drive 537. Secondary memory 530 represents a non-transitory medium, which may store the data (for example, electronic resources generated by desktop applications or chat sessions) and software instructions (for example, for performing the steps of FIG. 2), to enable digital processing system 500 to provide several features in accordance with the present disclosure. The code/instructions stored in secondary memory 530 may either be copied to RAM 520 prior to execution by CPU 510 for higher execution speeds, or may be directly executed by CPU 510.

Secondary memory 530 may contain hard drive 535, flash memory 536, and removable storage drive 537. Some or all of the data and instructions may be provided on removable storage unit 540, and the data and instructions may be read and provided by removable storage drive 537 to CPU 510. Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 530. Volatile media includes dynamic memory, such as RAM 520. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 550. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

8. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of viewing electronic resources by a user, said method comprising:
    receiving, via a browser window corresponding to a browser application, a string for identifying a next resource sought to be accessed by said user in said browser window;
    determining a first set of resource identifiers matching said string, wherein each resource identifier of said first set of resource identifiers specifies a corresponding electronic resource of a first set of electronic resources, wherein each resource identifier is present as a corresponding text in the content of a first file of a plurality of files previously accessed by said user, wherein a specific resource identifier is said to match said string when said string is contained in the corresponding text for said specific resource identifier present in the content of said first file, wherein the content of each of said plurality of files including the corresponding text representing said first set of resource identifiers is formed by said user using a non-browser application such that said plurality of files are previously accessed by said user in said non-browser application;
    listing said first set of electronic resources on a display unit;
    receiving selection of an electronic resource, identified by a resource identifier, from said first set of electronic resources listed on said display unit;
    retrieving said electronic resource corresponding to said selection, wherein said next resource is said retrieved electronic resource; and
    displaying the content of said retrieved electronic resource in said browser window on said display unit, wherein said user is provided access, from said browser application, to electronic resources specified by the resource identifiers present in the content of said first file previously accessed by said user using said non-browser application.

2. The method of claim 1, wherein said string is entered by said user in an address bar of said browser window corresponding to said browser application, and
    wherein said address bar further contains said resource identifier of said selected resource identifier while displaying the content of said retrieved electronic resource.

3. The method of claim 2, wherein said electronic resource is selected at a first time instance,
    wherein said determining determines a set of URLs (Uniform Resource Locators) corresponding to web pages previously accessed using said browser application,
    wherein said listing includes a second set of electronic resources on said display unit, wherein each electronic resource of said second set of electronic resources corresponds to one of said set of URLs, said method further comprises:
    receiving at a second time instance selection of another electronic resource, wherein said another selected electronic resource is a resource corresponding to one of said first set of electronic resources and said second set of electronic resources, wherein the content of said another electronic resource is retrieved and displayed in response to selection of said another electronic resource, wherein said listing includes at least another resource of said second set of electronic resources which has a URL that does not contain said string, but has an associated tag which contains said string.

4. The method of claim 2, wherein a data store stores said plurality of files previously accessed by said user using said non-browser application, wherein said determining of said first set of resource identifiers comprises:

searching content of said plurality of files stored on said data store, for a match with said string; and including in said first set of resource identifiers, each resource identifier matching said string and present in said plurality of files.

5. The method of claim 2, wherein said non-browser application is a chat application component of an enterprise application, wherein said first set of resource identifiers are exchanged in a chat session with said user using said chat application, and wherein the content of said first file is a transcript of said chat session using said chat application such that said user is provided access, from said browser application, to electronic resources referred to in the transcript of said chat session stored in said first file.

6. The method of claim 2, wherein said listing comprises populating a drop down list associated with said address bar with said first set of electronic resources and said second set of electronic resources.

7. The method of claim 6, wherein said listing further comprises arranging said first set of electronic resources and said second set of electronic resources in corresponding separate sections of said drop down list.

8. The method of claim 1, wherein said receiving of said string, said determining, said listing and said receiving of said selection are performed in a widget, wherein said displaying comprises launching an application designed to display the content of said retrieved electronic resource.

9. A non-transitory machine readable medium storing one or more sequences of instructions for enabling a user to view electronic resources using a system, wherein execution of said one or more instructions by one or more processors contained in said system enables said system to perform the actions of:

receiving, via a browser window corresponding to a browser application, a string for identifying a next resource sought to be accessed by said user in said browser window;

determining a first set of resource identifiers matching said string, wherein each resource identifier of said first set of resource identifiers specifies a corresponding electronic resource of a first set of electronic resources, wherein each resource identifier is present as a corresponding text in the content of a first file of a plurality of files previously accessed by said user, wherein a specific resource identifier is said to match said string when said string is contained in the corresponding text for said specific resource identifier present in the content of said first file, wherein the content of each of said plurality of files including the corresponding text representing said first set of resource identifiers is formed by said user using a non-browser application such that said plurality of files are previously accessed by said user in said non-browser application;

listing said first set of electronic resources on a display unit;

receiving selection of an electronic resource, identified by a resource identifier, from said first set of electronic resources listed on said display unit;

retrieving said electronic resource corresponding to said selection, wherein said next resource is said retrieved electronic resource; and displaying the content of said retrieved electronic resource in said browser window on said display unit, wherein said user is provided access, from said browser application, to electronic resources specified by the resource identifiers present in the content of said first file previously accessed by said user using said non-browser application.

10. The non-transitory machine readable medium of claim 9, wherein said string is entered by said user in an address bar of said browser window corresponding to said browser application, and wherein said address bar further contains said resource identifier of said selected resource identifier while displaying the content of said retrieved electronic resource.

11. The non-transitory machine readable medium of claim 10, wherein said electronic resource is selected at a first time instance, wherein said determining determines a set of URLs (Uniform Resource Locators) corresponding to web pages previously accessed using said browser application, wherein said listing includes a second set of electronic resources on said display unit, wherein each electronic resource of said second set of electronic resources corresponds to one of said set of URLs, said actions further comprises:

receiving at a second time instance selection of another electronic resource, wherein said another selected electronic resource is a resource corresponding to one of said first set of electronic resources and said second set of electronic resources, wherein the content of said another electronic resource is retrieved and displayed in response to selection of said another electronic resource, wherein said listing includes at least another resource of said second set of electronic resources which has a URL that does not contain said string, but has an associated tag which contains said string.

12. The non-transitory machine readable medium of claim 10, wherein a data store stores said plurality of files previously accessed by said user using said non-browser application, wherein said determining of said first set of resource identifiers comprises:

searching content of said plurality of files stored on said data store, for a match with said string; and including in said first set of resource identifiers, each resource identifier matching said string and present in said plurality of files.

13. The non-transitory machine readable medium of claim 10, wherein said non-browser application, wherein said first set of resource identifiers are exchanged in a chat session with said user using said chat application, and wherein the content of said first file is a transcript of said chat session using said chat application such that said user is provided access, from said browser application, to electronic resources referred to in the transcript of said chat session stored in said first file.

14. A computing system comprising:
a processor;
a random access memory (RAM);
a machine readable medium to store one or more instructions, which when retrieved into said RAM and executed by said processor causes said computing system to perform the actions of:
   receiving, via a browser window corresponding to a browser application, a string for identifying a next resource sought to be accessed by said user in said browser window;
   determining a first set of resource identifiers matching said string, wherein each resource identifier of said first set of resource identifiers specifies a corresponding electronic resource of a first set of electronic resources, wherein each resource identifier is present as a corresponding text in the content of a first file of a plurality of files previously accessed by said user, wherein a specific resource identifier is said to match said string when said string is contained in the corresponding text for said specific resource identifier present in the content of said first file, wherein the content of each of said plurality of files including the corresponding text representing said first set of resource identifiers is formed by said user using a non-browser application such that said plurality of files are previously accessed by said user in said non-browser application;
   listing said first set of electronic resources on a display unit;
   receiving selection of an electronic resource, identified by a resource identifier, from said first set of electronic resources listed on said display unit;
   retrieving said electronic resource corresponding to said selection, wherein said next resource is said retrieved electronic resource; and
   displaying the content of said retrieved electronic resource in said browser window on said display unit,
   wherein said user is provided access, from said browser application, to electronic resources specified by the resource identifiers present in the content of said first file previously accessed by said user using said non-browser application.

15. The computing system of claim 14, wherein said string is entered by said user in an address bar of said browser window corresponding to said browser application, and
wherein said address bar further contains said resource identifier of said selected resource identifier while displaying the content of said retrieved electronic resource.

16. The computing system of claim 15, wherein said electronic resource is selected at a first time instance,
   wherein said determining determines a set of URLs (Uniform Resource Locators) corresponding to web pages previously accessed using said browser application,
   wherein said listing includes a second set of electronic resources on said display unit, wherein each electronic resource of said second set of electronic resources corresponds to one of said set of URLs, said actions further comprise:
   receiving at a second time instance selection of another electronic resource, wherein said another selected electronic resource is a resource corresponding to one of said first set of electronic resources and said second set of electronic resources, wherein the content of said another electronic resource is retrieved and displayed in response to selection of said another electronic resource,
   wherein said listing includes at least another resource of said second set of electronic resources which has a URL that does not contain said string, but has an associated tag which contains said string.

17. The computing system of claim 15, wherein a data store stores said plurality of files previously accessed by said user using said non-browser application, wherein said determining of said first set of resource identifiers comprises:
   searching content of said plurality of files stored on said data store, for a match with said string; and
   including in said first set of resource identifiers, each resource identifier matching said string and present in said plurality of files,
   wherein said non-browser application is a chat application component of an enterprise application and the content of said first file is a transcript of a chat session using said chat application such that said user is provided access, from said browser application, to electronic resources referred to in the transcript of said chat session stored in said first file.

18. The computing system of claim 15, wherein said listing comprises populating a drop down list associated with said address bar with said first set of electronic resources and said second set of electronic resources.

19. The computing system of claim 6, wherein said listing further comprises arranging said first set of electronic resources and said second set of electronic resources in corresponding separate sections of said drop down list.

* * * * *

UNITED STATES PATENT AND TRADEMARK OFFICE
CERTIFICATE OF CORRECTION

PATENT NO. : 10,044,804 B2  
APPLICATION NO. : 14/659650  
DATED : August 7, 2018  
INVENTOR(S) : Paulsami et al.

Page 1 of 1

It is certified that error appears in the above-identified patent and that said Letters Patent is hereby corrected as shown below:

In the Claims

In Column 18, Line 47, in Claim 19, delete "claim 6" and insert -- claim 18 --, therefor.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*